UNITED STATES PATENT OFFICE.

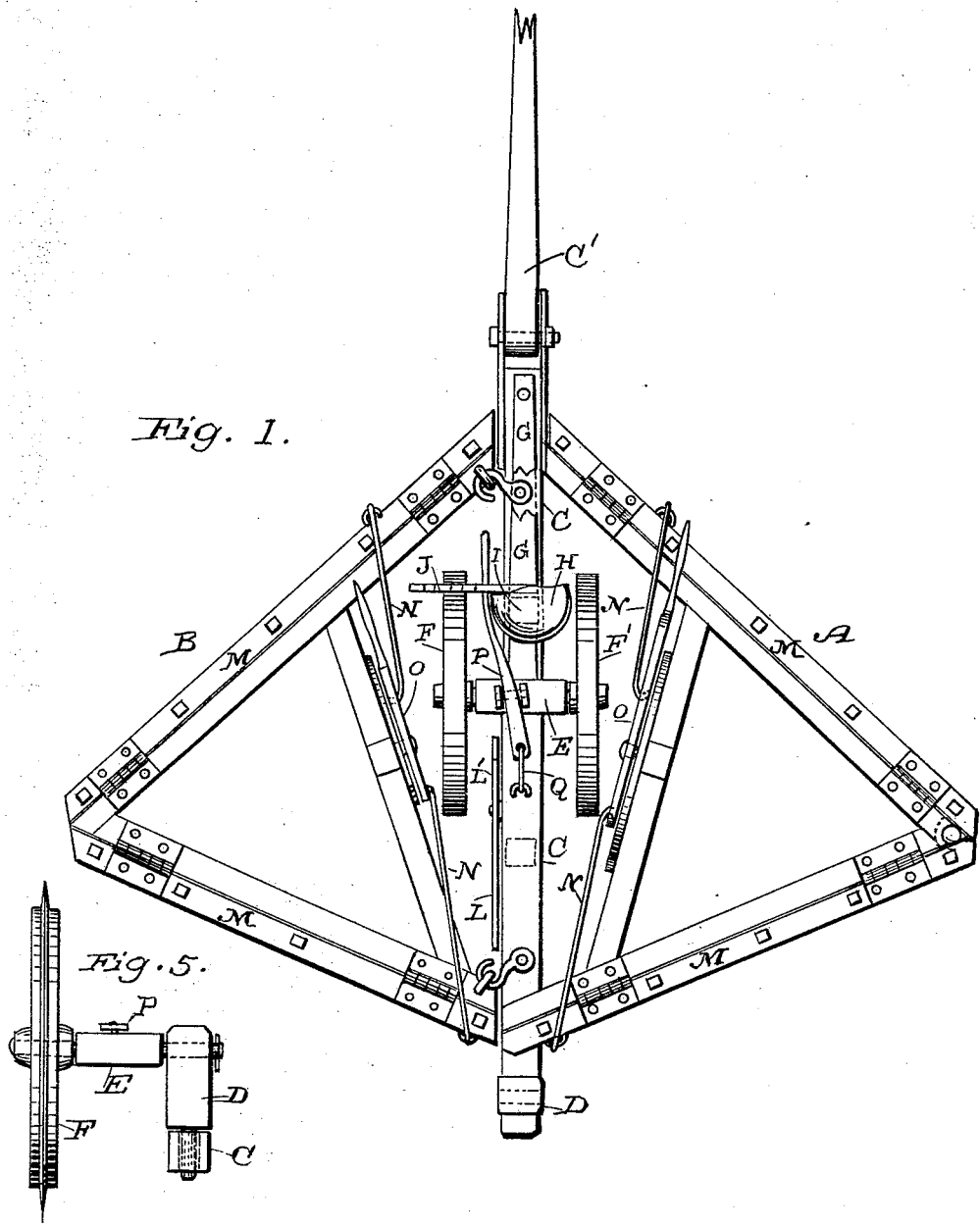

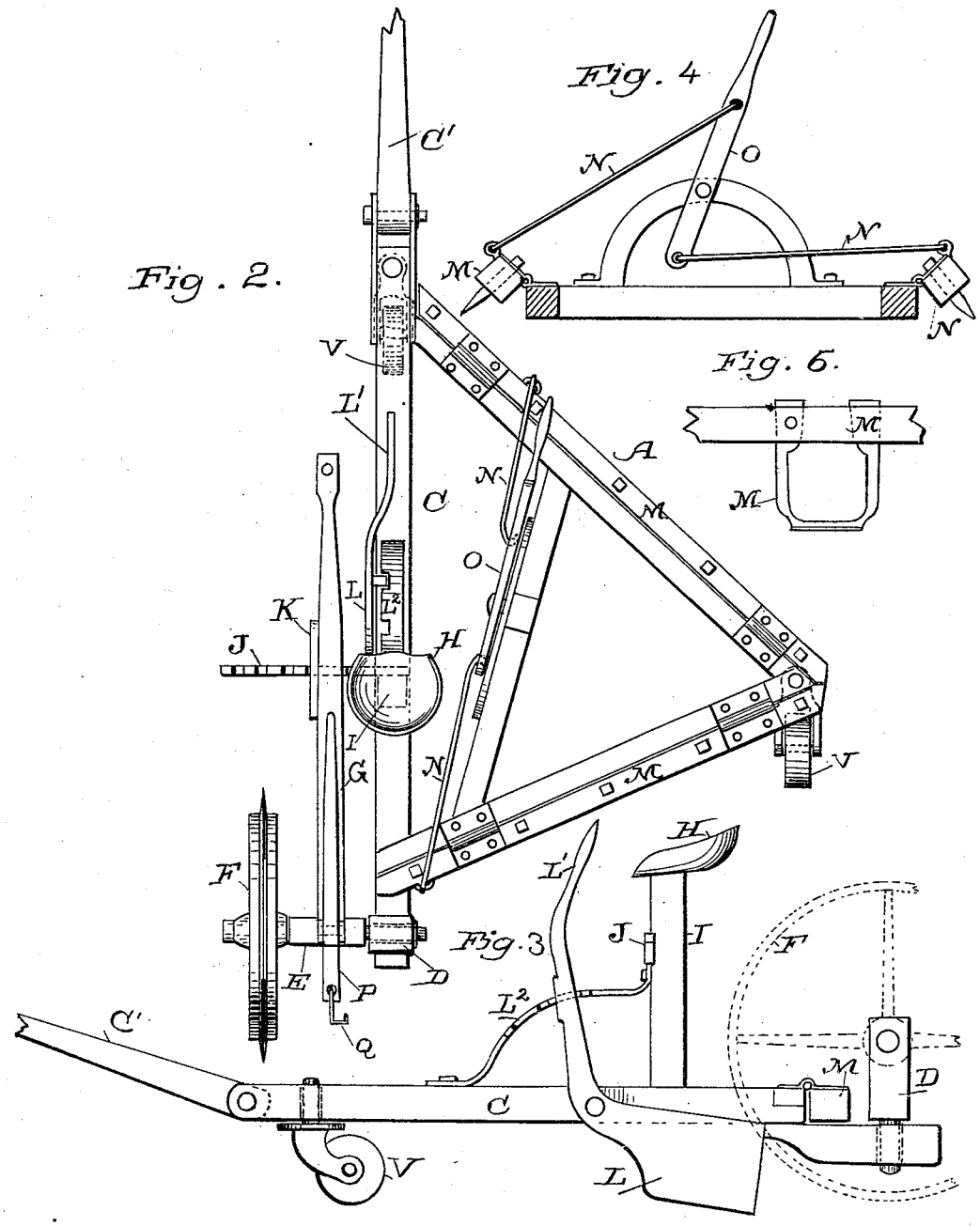

THOMAS JEFFERSON HUBBELL, OF SAN BERNARDINO, CALIFORNIA, ASSIGNOR OF ONE-THIRD TO GEORGE H. SMITH, OF SAME PLACE.

HARROW AND CULTIVATOR.

SPECIFICATION forming part of Letters Patent No. 484,739, dated October 18, 1892.

Application filed November 11, 1891. Serial No. 411,624. (No model.)

*To all whom it may concern:*

Be it known that I, THOMAS JEFFERSON HUBBELL, a citizen of the United States, residing at San Bernardino, San Bernardino county, State of California, have invented an Improvement in Harrows and Cultivators; and I hereby declare the following to be a full, clear, and exact description of the same.

My invention relates to certain improvements in apparatus for preparing and cultivating the ground.

It consists of a hinged separable frame with bearing and steering wheels, adjusting-levers, and certain details of construction, which will be more fully explained by reference to the accompanying drawings, in which—

Figure 1 is a top view showing my invention to be used as a harrow. Fig. 2 is a top view when used as a cultivator. Fig. 3 is a side view. Fig. 4 is a cross-section of one of the frames, showing the manner of raising or lowering the teeth out of the ground. Fig. 5, Sheet 1, is an end view. Fig. 6, Sheet 2, shows the cutter W.

A and B are two triangular frames made of suitable timbers properly joined together. The frame A has a bar C extending along one side, which forms the line of draft for the machine. This bar is provided with attachments which connect with corresponding parts upon the frame B, so that the two frames may be hinged together with their converging angular sides extending outwardly in each direction from the line of the draft-bar C and may be easily separated from each other. When used together, the device forms a harrow. When the frame A is used alone, it forms a side cultivator.

C' is a tongue, which is connected with the front end of the bar C, and to this the team is attached, by which the apparatus is drawn over the field.

At the rear end of the timber C is a vertical swiveling post D, which turns about its vertical axis. A short axle E has a flanged wheel F, mounted upon the spindle at one end, and the spindle at the opposite end fits into a hole made transversely in the top of the post D. A lever G is secured to the central portion of the axle and extends toward the front of the machine alongside the timber C. The seat H is mounted upon a post I, which is supported from the timber C and has a rack-bar J extending to one side, as shown. The lever G has a pawl-blade K fixed to it and extends across the rack-bar J within convenient reach of the driver. By moving the lever out or in the flanged wheel F, axle E, and supporting-post D are turned about the axis of the post, and the flanged wheel thus steers the cultivator and prevents side draft. I have also shown a rudder or centerboard consisting of a broad thin steel plate L, fulcrumed to the side of the beam C and having a lever L', by which it can be turned about its fulcrum, so that the blade may be caused to enter the ground, and thus guide and steady the cultivator, or it may be raised out of the ground. The rudder-blade is held at any desired point by a rack $L^2$, which extends in front of the seat-post, as shown.

V V are caster-wheels, the vertical swiveled shanks of which enter sockets in the front and exterior angles of the frame A, and these caster-wheels, in conjunction with the wheel F upon the axle E, serve to support this apparatus.

The hinged bars M, carrying the cultivator-teeth, extend parallel with the angular exterior bars of the frame A, to which they are attached, and they are connected by rods N with a lever O, which is fulcrumed to the frame A, so that the cultivator-teeth may be thrown into or out of the ground by the movement of this lever, which turns the tooth-carrying bars about their hinges. By this construction when the device is drawn along the ground it acts as a side cultivator, projecting so that its outer end may pass under low hanging branches or vines and cultivate close up to the rows of vines or plants which are to be cultivated, and it is held to its work and side draft prevented by the steering-wheel or the rudder-blade.

In order to cut any weeds or material which it is desirable to remove, I fix upon one of the hinged bars M the bail-shaped knives W, which are thrown into or out of the ground by the movement of the hinge-bars above described.

When the apparatus is to be used as a harrow, the frame B is hinged to the beam C in any suitable manner to provide a flexible connection, and it then extends to the opposite side from the frame A and in the same manner, as shown in Fig. 1. The frame B is provided with hinged tooth-bars M and operating-lever O, the same as shown upon the frame A, and both frames may also carry harrow-teeth. In order to raise and lower this harrow-frame, the axle E is removed from the post D, and a wheel F' is placed upon this end of the spindle. The axle E is then placed above the timber C, and the lever G extending along this timber is connected with it or with the tongue C'.

P is a lever fulcrumed upon the axle E, and its short arm is connected by a link Q with the beam C, so that by depressing the long arm the beam C and the two frames A and B will be raised and the harrow-teeth disengaged from the ground. This also enables me to free the teeth from weeds or other obstruction.

The seat-post is preferably lifted from its socket in the beam C, and is inserted into a similar socket in the axle E or the lever G near its junction with the axle, and this position enables the driver to operate the lever P conveniently with his foot.

It will be manifest that if it is desired to steady the harrow and prevent its swinging from side to side the rudder-blade L may be used for this purpose, as previously described.

Having thus described my invention, what I claim as new, and desire to secure by Letters Patent, is—

1. A cultivator consisting of a triangular frame, a draft-pole attached thereto in line with one of the sides, supplemental tooth-carrying bars hinged to the other sides of the triangle, a lever and connection by which they may be turned about their hinges, and swivel and steering wheels upon which the angles of the frame are supported, substantially as herein described.

2. A cultivator consisting of a triangular tooth-carrying frame, a draft-pole attached thereto in line with the longer side of the triangle, swivel-wheels upon which the front and outer angles of the frame are supported, an axle having a flanged bearing-wheel at one end and the opposite end adapted to swivel about a vertical axis and support at the rear of the frame a lever connected with the axle, whereby it may be turned, and a rack which is engaged by the lever to hold it at any desired angle, substantially as herein described.

3. A cultivator consisting of the triangular frame, with supplemental tooth and cutter bars hinged to the front and rear bars of the triangle, and a lever and connecting-rods, whereby said hinged bars may be turned up or down and the teeth and cutters thrown out of or into the ground, a guiding-blade Q, pivoted to the side of the central timber C, and the lever whereby it may be thrown into the ground or withdrawn therefrom, substantially as herein described.

4. A cultivator consisting of the triangular frames connected together upon a central line, a short axle detachably connected with the central frame-timber, a vertical swiveled post attached to the rear end of said timber, having the upper end adapted to receive one end of the axle from which the wheel has been removed, a lever-arm projecting from said axle, and a rack extending outwardly from the side of the seat-post and engaged by the lever-arm, whereby the wheel may be turned to travel more or less parallel with the line of travel of the machine and act as a rudder-wheel therefor, substantially as herein described.

5. A harrow consisting of the sections arranged longitudinally in line of travel with the draft and draft-tongue, a short axle connected with the longitudinal central timber, and wheels mounted upon the ends of said axle within the exterior projecting frames of the harrow, a lever fulcrumed upon the axle and connected with the central frame-timber, whereby the latter may be raised or depressed, supplemental bars M, carrying cultivator-teeth and hinged to the front and rear of the triangular frames, respectively, levers fulcrumed upon said frames, and rods connecting said levers with the hinged bars, whereby the latter may be turned up or down about their hinges to throw the cultivator-teeth in or out of the ground, substantially as herein described.

6. A harrow and cultivator consisting of the triangular frames connected together upon a central line, with a draft-tongue secured to the front end of the frame, an axle removably attached to the central timber, and a lever fulcrumed upon said axle and connected with the central timber of the harrow, substantially as herein described.

In witness whereof I have hereunto set my hand.

THOMAS JEFFERSON HUBBELL.

Witnesses:
C. H. CONDEE,
M. V. SWEESY.